US006997194B2

(12) United States Patent
Maconachy

(10) Patent No.: US 6,997,194 B2
(45) Date of Patent: *Feb. 14, 2006

(54) HARVESTING APPARATUS AND METHOD THEREFOR

(75) Inventor: Frank J. Maconachy, Salinas, CA (US)

(73) Assignee: Ramsay Highlander, Inc., Salinas, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 10/207,779

(22) Filed: Jul. 31, 2002

(65) Prior Publication Data

US 2004/0022620 A1 Feb. 5, 2004

(51) Int. Cl.
 *B08B 9/20* (2006.01)
(52) U.S. Cl. .................. 134/25.3; 134/25.1; 134/32; 134/36; 134/42; 134/199; 56/9; 56/10.1; 56/327.1; 56/328.1
(58) Field of Classification Search .............. 134/25.3, 134/32, 36, 42, 199, 25.1; 56/9, 10.1, 327.1, 56/328.1
See application file for complete search history.

(56) References Cited

U.S. PATENT DOCUMENTS

| 2,647,525 | A | * | 8/1953 | Duda et al. ................. 134/63 |
| 3,690,395 | A | * | 9/1972 | Spiller et al. .............. 180/6.48 |
| 4,355,433 | A | * | 10/1982 | Dietrich ...................... 15/302 |
| 5,480,352 | A | * | 1/1996 | Luscombe ................. 460/114 |
| 6,463,722 | B1 | * | 10/2002 | de Groot .................... 56/12.9 |
| 6,626,192 | B1 | * | 9/2003 | Garcia et al. ............. 134/25.3 |

FOREIGN PATENT DOCUMENTS

GB    2 164 234    * 3/1986

* cited by examiner

*Primary Examiner*—M. Kornakov
(74) *Attorney, Agent, or Firm*—Jeffrey Weiss; Janine R. Novatt; Weiss, Moy & Harris, P.C.

(57) ABSTRACT

An improved self-propelled harvester. The self-propelled harvester passes through a field to be harvested, while laborers place produce on a conveyor belt thereon. The produce is passed through a washing station, where it is preferably exposed to sideward and downward spray. Thereafter, the produce is transported upward along an elevator belt assembly, toward a trailer. The elevator belt assembly preferably has a plurality of flights located on rods positioned between side belts. The rods are spaced sufficiently so that leaves, debris and excess water can readily pass therethrough.

9 Claims, 4 Drawing Sheets

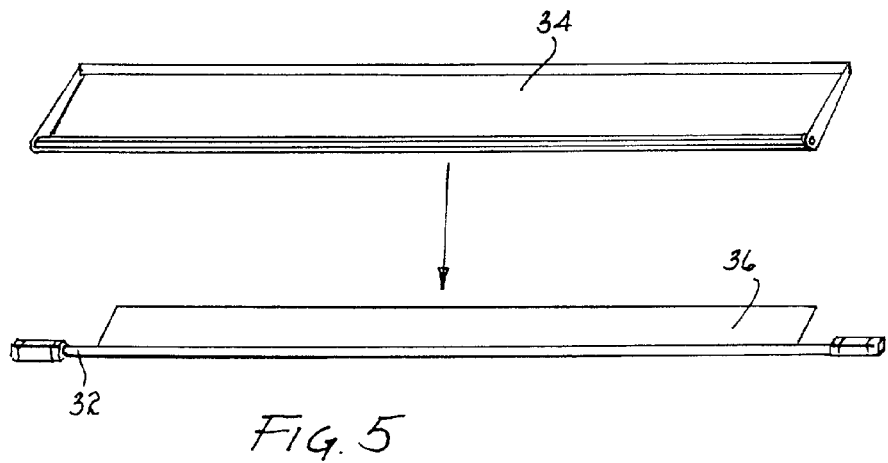
FIG. 5
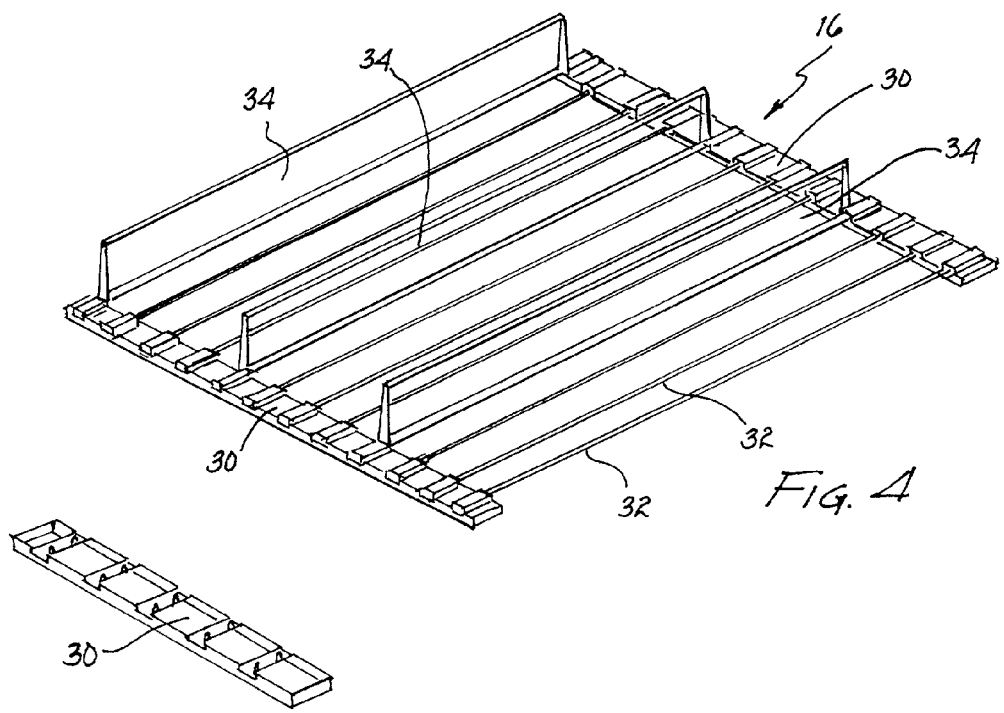
FIG. 4
FIG. 6

HARVESTING APPARATUS AND METHOD THEREFOR

BACKGROUND OF THE INVENTION

1. Field of Invention

This invention relates generally to apparatuses and methods for harvesting produce and, more specifically, to a self-propelled harvester that allows the improved harvesting, washing, and loading of produce.

2. Background of the Invention

In the harvesting of different types of produce (such as lettuce, tomatoes, bell peppers, and cantaloupes), it is desired to utilize a self-propelled conveyor belt. These travel through the field, with the labor force working along the conveyor. The laborers will harvest the produce, place it on the conveyor, and the conveyor will take it to a trailer that moves through the field in tandem with the harvester. In some versions of a harvester of this type, a washing station of some type can be provided, so that the produce is washed prior to be loaded into the trailer.

Because the conveyor belt needs to be at a level that is convenient for workers to reach when they place produce, and because the top of the trailer bed is at a higher point, it is necessary to utilize an elevator belt to transport the harvest and washed produce from the conveyor belt to the trailer. Prior art elevator belts consist of four inch high rubber flights that are bolted across a flat rubber belt at 12 inch intervals. The flat belt has a plurality of holes therethrough, to permit excess water from the washing step to pass therethrough.

However, prior art elevator belts permit leaves and other debris that is too large to pass through the holes to remain on the elevator belt and enter the trailer. This necessitates later removal and additional washing of the produce. Moreover, with their relatively small openings, prior art belts can be difficult to clean, allowing bacteria to grow thereon and further reducing the cleanliness of the process.

A need therefore existed for an improved self-propelled harvester having a conveyor belt, a washing station, and an elevator belt. The elevator belt should have an improved ability to remove leaves and other debris. The elevator belt should be easier to clean than the prior art design, limiting bacterial growth. Still further, the improved self-propelled harvester should provide for an efficient washing station, to further improve the cleaning process.

The present invention satisfies these needs and provides other, related, advantages.

SUMMARY OF THE INVENTION

It is an object of the present invention to provide an improved self-propelled harvester having a conveyor belt, a washing station, and an elevator belt.

It is a further object of the present invention to provide an improved self-propelled harvester wherein the elevator belt has an improved ability to remove leaves and other debris.

It is a still further object of the present invention to provide an improved self-propelled harvester wherein the elevator belt is easier to clean than the prior art design, limiting bacterial growth.

It is a yet further object of the present invention to provide an improved self-propelled harvester having an efficient washing station, to further improve the cleaning process.

BRIEF DESCRIPTION OF THE PREFERRED EMBODIMENTS

In accordance with one embodiment of the present invention, a self-propelled harvester is disclosed. The harvester comprises, in combination: a conveyor belt transported on a plurality of wheels; a washing station positioned over a portion of the conveyor belt; an elevator belt assembly proximate the washing station and adapted to transport produce from an exit point from the washing station in an upward direction to be loaded onto a trailer; wherein the elevator belt assembly comprises: two side belts; a plurality of rods extended between the side belts; and a plurality of flights, wherein each the flight is coupled to one the rod and wherein the number of the rods is greater than the number of the flights, so that some the rods do not have any the flight coupled thereto.

In accordance with another embodiment of the present invention, a self-propelled harvester is disclosed. The harvester comprises, in combination: a conveyor belt transported on a plurality of wheels; a washing station positioned over a portion of the conveyor belt; wherein the washing station comprises a plurality of spray nozzles oriented to expose the produce passing therethrough to downward and sideward projecting spray; and an elevator belt assembly proximate the washing station and adapted to transport produce from an exit point from the washing station in an upward direction to be loaded onto a trailer.

In accordance with still another embodiment of the present invention, a method for harvesting is disclosed. The method comprises, in combination, the steps of: providing a self-propelled harvester comprising, in combination: a conveyor belt transported on a plurality of wheels; a washing station positioned over a portion of the conveyor belt; an elevator belt assembly proximate the washing station and adapted to transport produce from an exit point from the washing station in an upward direction to be loaded onto a trailer; wherein the elevator belt assembly comprises: two side belts; a plurality of rods extended between the side belts; and a plurality of flights, wherein each the flight is coupled to one the rod and wherein the number of the rods is greater than the number of the flights, so that some the rods do not have any the flight coupled thereto; propelling the harvester through a field to be harvested; harvesting the produce; placing the produce on the conveyor belt; passing the produce through the washing station; transporting the produce from the washing station to the elevator belt assembly; elevating the produce on the elevator belt assembly; outputting the produce from the elevator belt assembly into a trailer.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 4 is a perspective view of the elevator belt of the harvester of FIG. 1.

FIG. 5 is a perspective view of an individual flight component of the elevator belt of FIG. 4.

FIG. 6 is a perspective view of the belt portion of the elevator belt of FIG. 4.

DETAILED DESCRIPTION OF THE PREFERRED EMBODIMENTS

Figure 1:
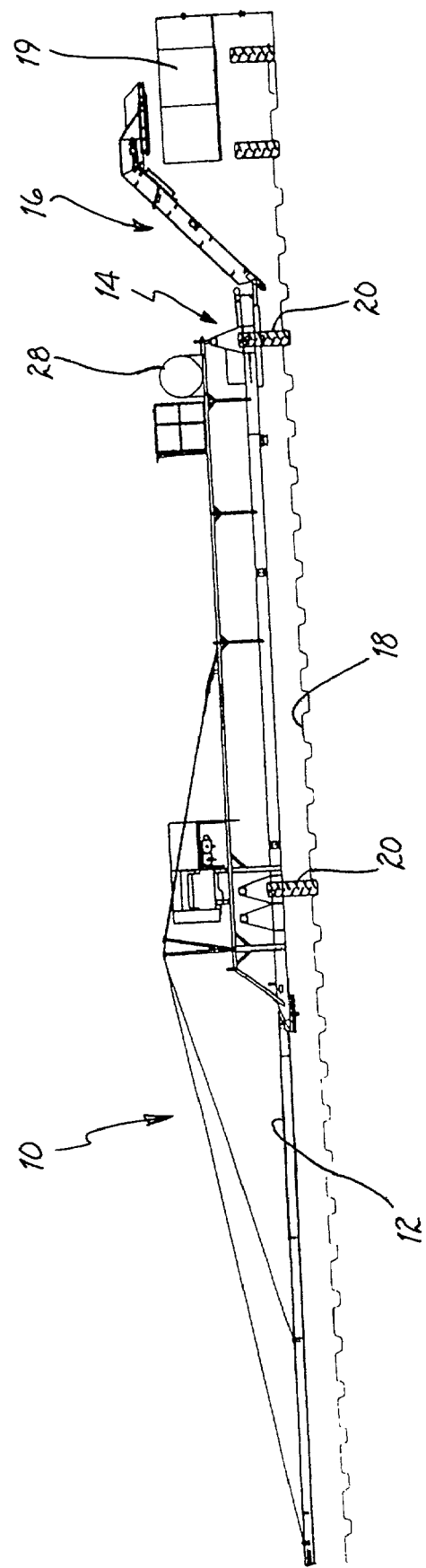
FIG. 1 is a front view of a self-propelled harvester consistent with the present invention.

Referring first to FIG. 1, a self-propelled harvester 10 (hereinafter "harvester 10") consistent with the present invention is shown. The main components of the harvester 10 include a conveyor belt 12 (which may be a rubber belt, a PVC belt, or a stainless steel rod assembly as shown for example in FIG. 5), a washing station 14, and an elevator belt assembly 16. The harvester 10 is transported through a field 18 on four wheels 20, with the wheels being capable of turning 90 degrees so that the harvester 10 can move either through a field or across row-ends. (The 90 degree turning of the wheels can be seen by comparing FIG. 1, which illustrates the desired position for movement through a field, and FIG. 2, which illustrates the desired position for movement along row-ends.) It is preferred that each end of the harvester 10 be provided with its own drive and steering mechanism.

Typically, a trailer 19 will be transported alongside the harvester 10 during actual harvesting. This permits produce 22 (see FIG. 2) exiting the elevator belt assembly 16 to fall directly into the trailer 19.

Figure 2:
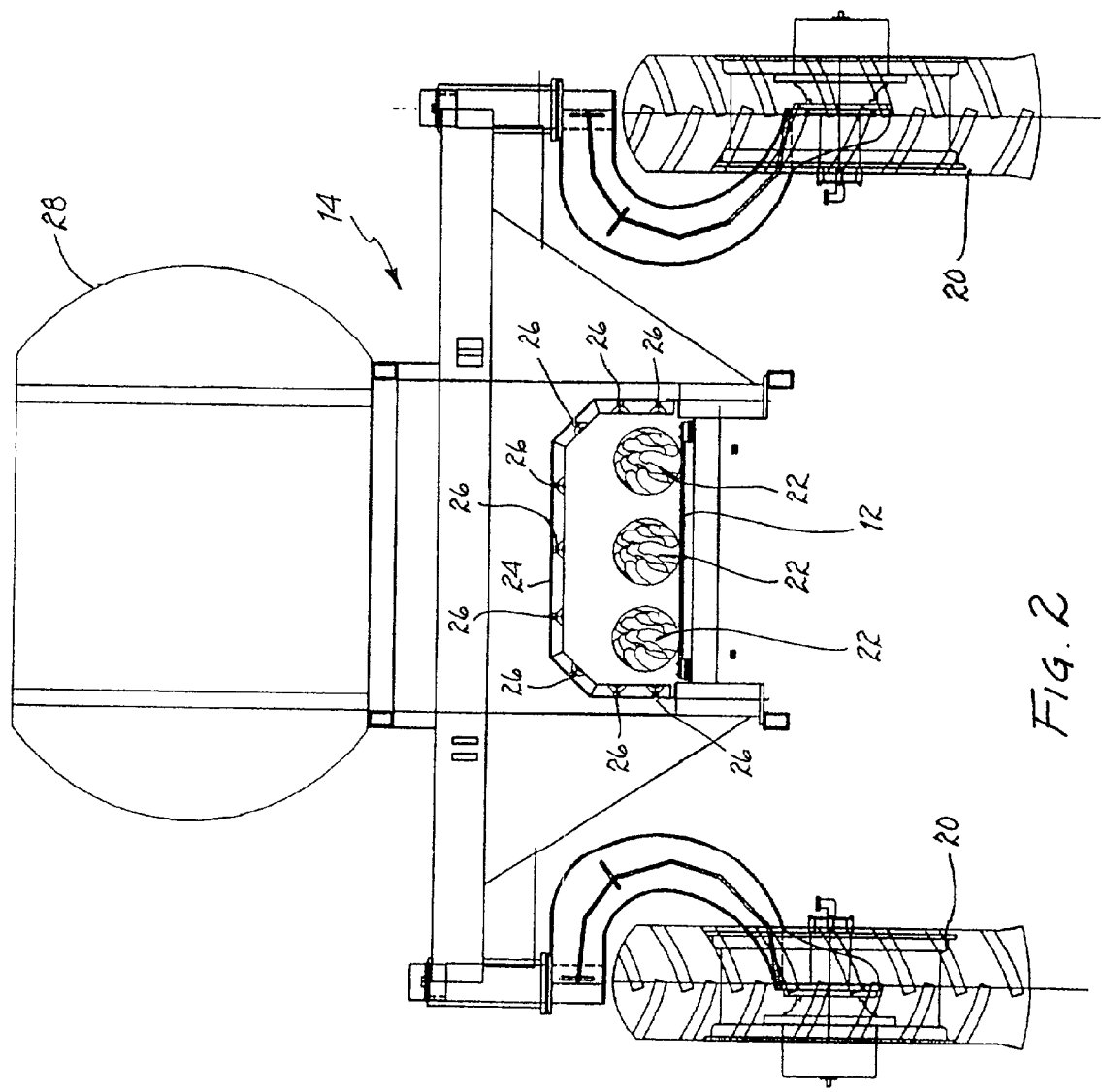
FIG. 2 is an end view of the self-propelled harvester of FIG. 1, particularly illustrating the washing station.

Referring now to FIG. 2, attention is directed to the washing station 14 portion of the harvester 10. Initially, it can be seen that the conveyor belt 12 transports produce 22 through the washing station 14. The washing station 14 itself preferably comprises a housing 24, into which a plurality of spray nozzles 26 are positioned. The positioning of the spray nozzles 26 should, preferably, expose the produce 22 to spray from the side and the top. While it would be possible to utilize a prior art spray configuration, consisting, for example, of spraying from the bottom or spraying from the top, the configuration shown in FIG. 2 is preferred. (Water for the washing station 14 comes from a water tank 28 positioned thereabove. Alternatively, water could be delivered from a recycle tank (not shown) located directly beneath the water station 14 and conveyor belt 12.)

Figure 3:
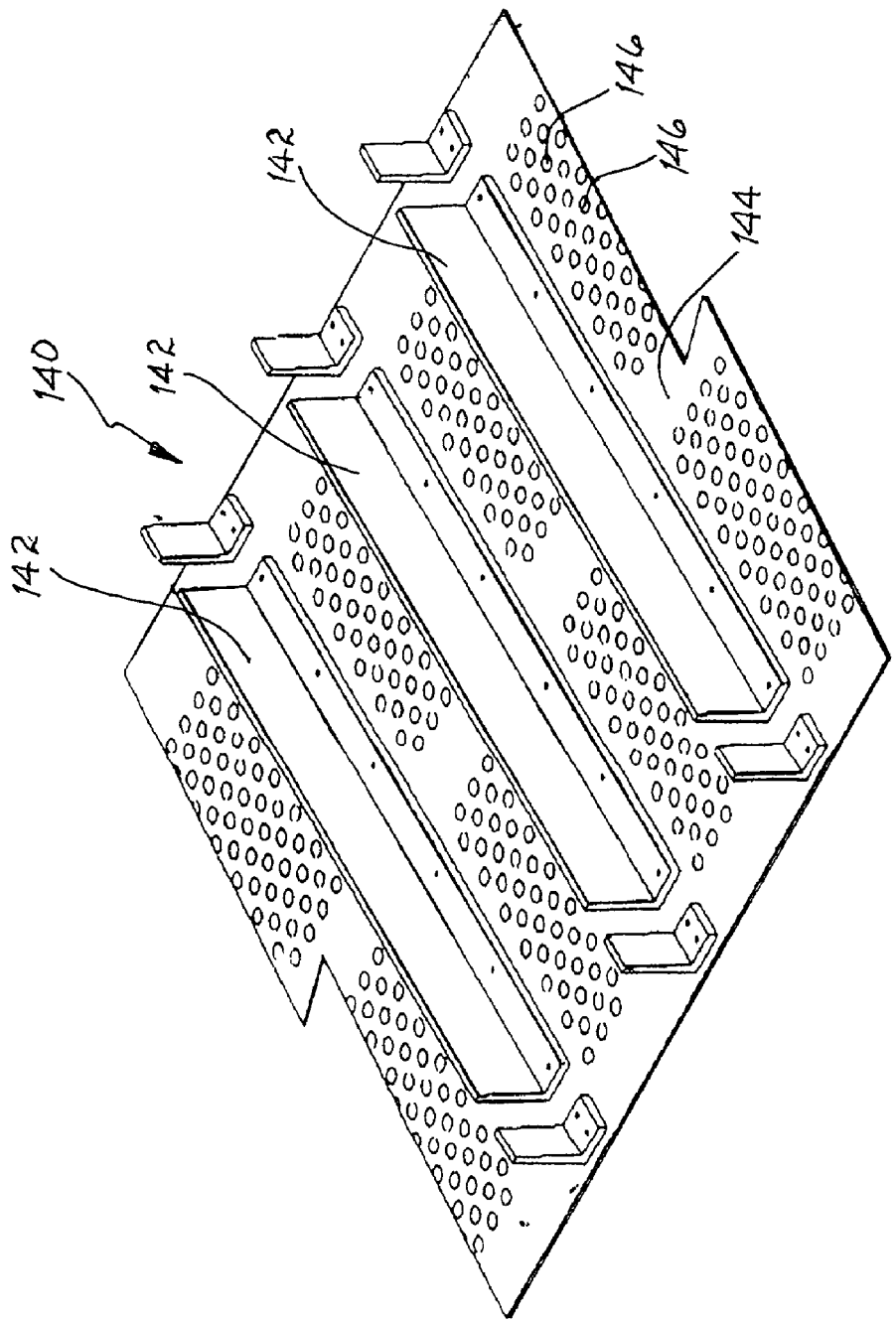
FIG. 3 is a perspective view of a prior art elevator belt.

Referring now to FIG. 3, a prior art elevator belt 140 is shown. In the prior art belt 140, a plurality of four inch flights 142 are bolted at approximately 12 inch intervals across a perforated belt 144. The perforations 146 in the belt 144 are for purposes of allowing excess water from the washing station to pass therethrough. However, this configuration does not permit leaves or other debris to pass through the belt 140, and also makes the belt 140 more difficult to clean and more prone to foster the growth of bacteria.

Referring now to FIGS. 4–6, an embodiment of the elevator belt assembly 16 consistent with the present invention is shown. The elevator belt assembly 16 generally comprises side belts 30, preferably formed of a food grade material, such as SBR rubber with polyethylene and polyesthylene webbing. Coupled across the side belts 30 are a plurality of rods 32. At desired intervals (preferably about 12 inches), flights 34 are coupled to rods 32. The space of the rods 32, which are preferably about three and three-eighths inches apart, permits leaves, debris, and a greater volume of excess water to pass through the elevator belt assembly 16, as compared to the prior art belt 140 shown in FIG. 3.

Referring specifically to FIG. 5, a possible configuration of a flight 34 is shown. In this embodiment, a flatbar 36 is coupled, preferably by welding, to a rod 32. The flight 34 is then molded around each of the flatbar 36 and rod 32. To ease in the cleaning of the elevator belt assembly 16, it is preferred that each of the rod 32, flight 34, and flatbar 36 be composed of stainless steel.

While the invention has been particularly shown and described with reference to preferred embodiments thereof, it will be understood by those skilled in the art that the foregoing and other changes in form and details may be made therein without departing from the spirit and scope of the invention.

For example, the spacing of the rods 32 and flights 34 may be adjusted, particularly as desired to accommodate particular produce 22. Further, it may be possible to couple the flight directly to the rod 32, without the need for a flatbar 36. Moreover, it may be possible to utilize the water station 14 as described herein with a harvester 10 having a prior art 140, or to utilize a harvester 10 having an elevator belt assembly 16 in combination with a prior art water station.

Still further, it may be desired to substitute chains, perhaps comprised of a stainless steel material, for the side belts 30.

I claim:

1. A method for harvesting comprising, in combination, the steps of:
    providing a self-propelled harvester comprising, in combination:
        a conveyor belt transported on a plurality of wheels;
        a washing station positioned over a portion of said conveyor belt;
        an elevator belt assembly proximate said washing station and adapted to transport produce from an exit point from said washing station in an upward direction to be loaded onto a trailer;
        wherein said elevator belt assembly is provided with:
            two side belts;
            a plurality of rods with adjustable intervals therebetween, the said rods are extended between said side belts; and
            a plurality of flights with adjustable intervals therebetween, wherein each said flight is coupled to one said rod and wherein the number of said rods is greater than the number of said flights, so that some said rods do not have any said flight coupled thereto;
    adjusting intervals between the rods and the flights to accommodate said produce propelling said harvester through a field to be harvested;
    harvesting said produce;
    placing said produce on said conveyor belt;
    passing said produce through said washing station;
    transporting said produce from said washing station to said elevator belt assembly;
    elevating said produce on said elevator belt assembly;
    removing debris from around the produce through said plurality of rods of said elevator belt assembly; and
    outputting said produce from said elevator belt assembly into a trailer.

2. The method of claim 1 wherein the step of passing said produce through said washing station includes providing said washing station with a plurality of spray nozzles oriented to expose said produce passing therethrough to downward and sideward projecting spray.

3. The method of claim 1 wherein the step of elevating said produce on said elevator belt assembly includes providing said elevator belt assembly with the two side belts comprised of a food grade material.

4. The method of claim 3 wherein the step of elevating said produce on said elevator belt assembly includes providing said elevator belt assembly with the two side belts comprised of said food grade material including SBR rubber with polyethylene and polyesthylene webbing.

5. The method of claim 1 wherein the step of elevating said produce on said elevator belt assembly includes providing said elevator belt assembly with said rods positioned at intervals of approximately three and three-eighths inches.

6. The method of claim 1, wherein the step of elevating said produce on said elevator belt assembly includes providing said elevator belt assembly with said flights positioned at intervals of approximately 12 inches.

7. The method of claim 1 wherein the step of elevating said produce on said elevator belt assembly includes providing said elevator belt assembly with each of said flights and said rods composed of stainless steel.

8. The method of claim 1 wherein the step of elevating said produce on said elevator belt assembly includes providing said elevator belt assembly with a flatbar coupled to said rod and wherein said flight is coupled to said flatbar.

9. The method of claim 8 wherein the step of elevating said produce on said elevator belt assembly includes providing said elevator belt assembly with said flatbar composed of stainless steel.

* * * * *